Patented May 1, 1951

2,551,543

UNITED STATES PATENT OFFICE 2,551,543

PRODUCTION OF URANIUM PEROXIDE

Paul Mohr, Urbana, Ill., assignor to the United States of America as represented by the United States Atomic Energy Commission No Drawing. Application August 31, 1948,
Serial No. 47,143

3 Claims. (Cl. 23—14.5)

This invention relates to the production of uranium peroxide, and more particularly to the recovery of uranium as uranium peroxide from solutions and mixtures containing uranium; and still more particularly to the production, recovery and/or separation of uranium peroxide possessing desirable physical properties from solutions and mixtures containing uranium salts.

The process of producing uranium peroxide by precipitation from aqueous solutions has been carried out as a laboratory procedure in the past. However, prior workers who attempted to precipitate the peroxide from sulfuric acid solution were unsuccessful in securing any precipitation. Previous workers have noted that the presence of other salts, such as salts of barium, and calcium interfered with the precipitation of uranium peroxide. However, under the conditions of precipitation used in my process practically 100% of uranium content of the solution is secured in the form of an easily handled and filterable uranium peroxide.

Accordingly this invention has as an object the production of uranium peroxide possessing desirable physical properties.

A further object of this invention is to provide a method of producing, recovering and/or separating uranium as uranium peroxide from solutions or mixtures containing uranium.

A still further object of this invention is to provide a simple and efficient method for producing an easily handled and filterable uranium peroxide precipitate.

Still further objects of the present invention will be apparent from the following description taken in connection with the appended claims.

Broadly the objects of this invention are accomplished by the simultaneous addition of hydrogen peroxide and a water soluble inorganic base such as ammonium or alkali metal hydroxide to a uranium solution containing uranyl salts, such as uranyl sulfate or uranyl nitrate, while maintaining the pH of the solution between 2.5 and 4.

This preparation of uranium peroxide may be carried out under various conditions of temperature and concentration of reagents. Although the temperature of the preparation may be varied over quite a range it was found that the process could be carried out quantitatively at room temperatures. The hydrogen peroxide may be used in any concentration up to that of a saturated solution.

More specifically in accordance with the present invention the uranium peroxide possessing the desirable physical properties is precipitated from an aqueous uranium solution containing hexavalent uranium salts, such as uranyl sulfate, while the solution is maintained at a relatively constant pH between 2.5 and 4. These uranium solutions may be prepared by converting the uranium present in solutions and mixtures into a soluble salt or similarly soluble compounds and then oxidizing the uranium in solution to hexavalent uranium by simple aeration, or the addition of a sufficient amount of a peroxide, such as hydrogen or sodium, nitric acid, permanganate, or a chromate. Air is fairly effective but rather slow in completing the oxidation. One of the more active oxidizing agents may be used in conjunction with air for the final clean-up. Hydrogen peroxide has an advantage over the other oxidizing agents, listed in that it is less corrosive than nitric acid, and that it does not introduce a metallic ion which might interfere with the process or contaminate the uranium peroxide. As hydrogen peroxide is also used in the subsequent precipitation of uranium peroxide it simplifies the handling and storage problems involved. The pH of the uranium solution is maintained relatively constant at a value between 2.5 and 4 by the constant addition, as required, of a suitable base such as ammonium hydroxide or sodium hydroxide. Prior to the addition of the final hydrogen peroxide various metallic ions such as ferric may be removed by precipitation and filtration. Sufficient hydrogen peroxide in an amount equal to between 105% and 200% of the quantity theoretically required for the conversion of hexavalent uranium present to uranium peroxide is then added while the pH of the solution is maintained at a relatively constant value between 2.5 and 4 by the simultaneous addition of a suitable base such as ammonium hydroxide. The hydrogen peroxide may be added as an aqueous solution in any concentration up to that of a saturated solution, about 30%. The uranium peroxide precipitates quantitatively as a large, coarse, granular, crystalline precipitate which settles rapidly and is easily and rapidly separated from the mother solution by filtration, or by other separation methods such as by centrifugal separation or gravitational decantation. The precipitate may then be washed with water to remove adherent mother liquor. The uranium peroxide produced by the process of this invention is easy to handle and is suitable for the manufacture of uranium compounds of high purity.

The details of the present invention will become more apparent from the following examples which will further illustrate how the process by which the objects of this invention are accomplished may be carried out in practice; however the invention is not to be limited specifically to the details of these examples.

The data of a number of examples showing the precipitation of uranium peroxide by the addition of hydrogen peroxide to uranyl sulfate solutions are listed in the following table. In these examples the concentration of uranium in the uranyl sulfate solution was held constant at 5 grams of $U_3O_8$ per 100 ml. of solution. The amount of hydrogen peroxide added and the pH of the solution were varied. The rate and amount of sodium hydroxide added was also varied in all but Examples 7, 8 and 9 in which sufficient sodium hydroxide solution was added simultaneously with the hydrogen peroxide to maintain a relatively constant pH between 2.5 and 4.

Table

| Example | pH Initial | pH Final | Hydrogen Peroxide, Per Cent of Theory | Uranium Precipitated, Per Cent of Total |
| --- | --- | --- | --- | --- |
| 1 | 1 | 0.70 | 120 | 88.4 |
| 2 | 0.5 | 0.50 | 120 | 58.2 |
| 3 | 3 | 0.90 | 120 | 95.6 |
| 4 | 3 | 0.90 | 100 | 94.5 |
| 5 | 3 | 0.90 | 150 | 97.6 |
| 6 | 3 | 0.90 | 500 | 99.7 |
| 7 | 2.5 | 2.5 | 105 | 100 |
| 8 | 3.0 | 3.0 | 105 | 100 |
| 9 | 3.5 | 3.5 | 105 | 100 |

An analysis of the table indicates that the precipitation of uranium as uranium peroxide was quantitative only when the pH of the solution was held relatively constant at a pH between 2.5 and 3.5 or when an inordinate amount of hydrogen peroxide was added. In addition the uranium peroxide precipitate obtained in each of the first six examples was of an extremely finely divided gelatinous type that was very difficult to filter and had a very low settling rate; while the uranium peroxide precipitate obtained in each of the last three Examples 7, 8 and 9, in which the pH was held relatively constant by the simultaneous addition of a base, was of a large coarse, granular crystalline type that was very easy to filter and had a rapid settling rate. The difference in the methods used to produce these differing types of uranium peroxide precipitates is clearly brought out in the following four examples.

Example 1

To about 300 ml. of a uranyl sulfate solution, containing uranium equivalent to 5 grams of $U_3O_8$ per 100 ml. of solution, 100 ml. of 27½% $H_2O_2$ was gradually added over a period of one hour while the pH of the solution was maintained relatively constant between a pH of 3.6 and 3.0 by the simultaneous addition of a suitable amount of an aqueous sodium hydroxide solution. The uranium peroxide precipitated quantitatively as a coarse, granular non-gelatinous precipitate that settled very rapidly. This precipitate was very easily filtered on a Buchner funnel in approximately 5 minutes.

Example 2

As in Example 1, 100 ml. of 27½% $H_2O_2$ and sufficient sodium hydroxide to maintain the pH at 2.0 was gradually added to 300 ml. of a uranyl sulfate solution containing uranium equivalent to approximately 15 grams of $U_3O_8$. The uranium peroxide precipitated from the solution as a very finely divided precipitate which almost completely passed through the filter paper when filtered on a Buchner filter and was extremely difficult to separate from the mother liquor.

Example 3

Also as in Example 1, 100 ml. of 27½% $H_2O_2$ and a suitable amount of aqueous sodium hydroxide was added gradually over a period of one hour to 300 ml. of uranyl sulfate solution containing uranium equivalent to 5 grams of $U_3O_8$ per 100 ml. of solution. The pH of the solution was first maintained constant between a pH range of 3.0 and 3.6 and then allowed to drop to a pH of 2.0. At this pH most of the precipitate went through the paper and was of a very finely divided almost colloidal type that was most difficult to filter.

Example 4

To 300 ml. of a highly acid (the pH being approximately 0.4), solution of uranyl sulfate containing uranium equivalent to 5 grams $U_3O_8$ per 100 ml. of solution, 100 ml. of 27½ $H_2O_2$ was gradually added without the simultaneous addition of sodium hydroxide. The uranium peroxide formed remained dissolved in the solution and the solution remained clear. At this point the pH of the solution was noted to be less than 0.40. Sufficient aqueous sodium hydroxide was then gradually added over a period of two and three quarter hours to raise the pH from less than 0.4 to a pH of 3.7. Uranium peroxide started precipitating immediately upon the slow addition of the aqueous solution of sodium hydroxide. The uranium peroxide precipitate of this example was extremely finely divided and of a gelatinous nature which settled very slowly and was very difficult to separate from the mother solution by filtration.

As the above examples clearly show the process of producing uranium peroxide by maintaining a relatively constant pH between 2.5 and 4 by the simultaneous addition of a suitable base while adding the hydrogen peroxide to the uranyl salt solution as provided by this invention quantitatively produces a surprisingly highly desirable superior type of precipitate which is very pure and easy to handle, settling rapidly and filtering easily.

The uranium peroxide produced by the above preferred process is very pure and can be used to produce uranium compounds of high purity. It is desirable in the production of pure uranium peroxide by the process of this invention that suitable apparatus be employed to avoid introducing further impurities. Thus it is desirable to employ equipment composed of material inert to the reagents employed such as glass, rubber or wood.

Having broadly and specifically disclosed the present invention, it is apparent that many modifications and variations may be made without departing essentially from the nature and scope thereof as may be included within the following claims and it is intended to cover in the appended claims all such modifications as fall within the true spirit and scope of the disclosed invention.

I claim:

1. The process of producing uranium peroxide of a highly desirable character from uranyl sulfate solutions which comprises adding hydrogen peroxide to an aqueous uranyl sulfate solution to convert the hexavalent uranyl salt to uranium peroxide and simultaneously adding sodium hydroxide with the hydrogen peroxide to maintain a relatively constant pH between 2.5 and 4.

2. A method of recovering uranium from solutions which comprises converting the uranium present to uranyl sulfate; and precipitating the uranium as uranium peroxide by the simultaneous addition of hydrogen peroxide and sodium hydroxide while maintaining the pH of the solution between 2.5 and 4; and separating the uranium peroxide from the mother solution by filtration.

3. A method of producing an easily filterable uranium peroxide which comprises adding hydrogen peroxide to an aqueous solution of uranyl sulfate maintained at a relatively constant pH between 2.5 and 4.0 by the simultaneous addition of sodium hydroxide and separating the uranium peroxide precipitate by filtration.

PAUL MOHR.

REFERENCES CITED

The following references are of record in the file of this patent:

Friend: Textbook of Inorganic Chemistry, vol. VII, part III, page 311 (1926). Published by Charles Griffin & Company, Ltd., London. (Copy in Sci. Lib.)

Rosenheim et al.: Chemical Abstracts, vol. 23, page 4634 (1929). (Copy in Sci. Lib.)

Mellor: Comprehensive Treatise on Inorganic and Theoretical Chemistry, vol. 12, page 72 (1932). Published by Longmans, Green and Company, London. (Copy in Div. 59.)